United States Patent
Ruffini et al.

(10) Patent No.: US 11,153,065 B2
(45) Date of Patent: Oct. 19, 2021

(54) METHODS, APPARATUS AND COMPUTER-READABLE MEDIA FOR SYNCHRONIZATION OVER AN OPTICAL NETWORK

(71) Applicant: Telefonaktiebolaget LM Ericsson (publ), Stockholm (SE)

(72) Inventors: Stefano Ruffini, Pisa (IT); Mats Forsman, Rönninge (SE); Paola Iovanna, Pisa (IT); Stefano Stracca, Pisa (IT); Tomas Thyni, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/632,617

(22) PCT Filed: Jul. 25, 2017

(86) PCT No.: PCT/EP2017/068801
§ 371 (c)(1),
(2) Date: Jan. 21, 2020

(87) PCT Pub. No.: WO2019/020170
PCT Pub. Date: Jan. 31, 2019

(65) Prior Publication Data
US 2020/0169378 A1    May 28, 2020

(51) Int. Cl.
*H04L 7/00* (2006.01)
*H04B 10/27* (2013.01)
*H04J 14/02* (2006.01)

(52) U.S. Cl.
CPC ........... *H04L 7/0075* (2013.01); *H04B 10/27* (2013.01); *H04J 14/02* (2013.01)

(58) Field of Classification Search
CPC ......... H04L 7/0075; H04B 10/27; H04J 14/02
(Continued)

(56) References Cited

U.S. PATENT DOCUMENTS 9,473,261 B1   10/2016   Tse et al.
9,525,482 B1   12/2016   Tse
(Continued)

FOREIGN PATENT DOCUMENTS

EP   1 914 914 A1   4/2008
EP   2 528 254 A1   11/2012
(Continued)

OTHER PUBLICATIONS

Architecture and Applications of a Versatile Small-Cell, Multi-Service Cloud Radio Access Network Using Radio-Over-Fiber Technologies by Gee-Kung Chang et al.; IEEE International Conference on Communications 2013; IEEE ICC'13—Workshop on Optical-Wireless Integrated Technology for Systems and Networks 2013—2013.
(Continued)

*Primary Examiner* — Dalzid E Singh
(74) *Attorney, Agent, or Firm* — Baker Botts, LLP (57) ABSTRACT

The disclosure provides methods, apparatus and computer-readable media for synchronization over an optical network. A method comprises: receiving, from a client, a request to initiate a synchronization service for a client node coupled to the optical communication network; and, in response to the request, establishing a synchronization service to the client node via a virtual synchronization network utilizing the optical communication network. The synchronization service utilizes a bidirectional optical channel established via the optical communication network for the transmission of synchronization data for the client.

21 Claims, 6 Drawing Sheets

(58) Field of Classification Search
USPC .......................................................... 398/118
See application file for complete search history.

(56) References Cited

U.S. PATENT DOCUMENTS

| | | | | |
|---|---|---|---|---|
| 10,257,799 | B2* | 4/2019 | Ruffini | H04J 3/0655 |
| 2012/0224860 | A1* | 9/2012 | Kim | H04B 10/116 |
| | | | | 398/128 |
| 2012/0250738 | A1* | 10/2012 | Shako | H04J 3/0641 |
| | | | | 375/219 |
| 2013/0121248 | A1 | 5/2013 | Lee et al. | |
| 2013/0136068 | A1 | 5/2013 | Johansson et al. | |
| 2014/0226992 | A1* | 8/2014 | Takahashi | H04L 12/12 |
| | | | | 398/155 |
| 2016/0365920 | A1 | 12/2016 | Takemoto et al. | |

FOREIGN PATENT DOCUMENTS

| | | |
|---|---|---|
| EP | 2 663 141 A1 | 11/2013 |
| WO | 2008 022018 A2 | 2/2008 |
| WO | 2009 132456 A1 | 11/2009 |
| WO | 2015 044098 A1 | 4/2015 |
| WO | 2016 005008 A1 | 1/2016 |
| WO | 2017 012635 A1 | 1/2017 |
| WO | 2015 129167 A1 | 3/2017 |
| WO | 2018 104175 A1 | 6/2018 |

OTHER PUBLICATIONS

International Telecommunication Union, Telecommunication Standardization Sector, Study Period 2013-2016; Source: Ericsson; Title: Mapping of CPRI over DWDM channels; Allen, TX, USA—Mar. 16, 2015.

Future Proof Optical Network Infrastructure for 5G Transport by Paola Iovanna et al.; J. Opt. Commun. Netw./vol. 8, No. 12—Dec. 2016.

Series G: Transmission Systems and Media, Digital Systems and Networks, Digital terminal equipments—General; Series Y: Global Information Infrastructure, Internet Protocol Aspects and Next-Generation Networks, Internet of Things and Smart Cities, Internet protocol aspects—Transport; Interfaces for the optical transport network; ITU-T, Telecommunication Standardization Sector of ITU; G.709/Y.1331—Jun. 2016.

Regulatory Technical and Implementing Standards—Annex I, MiFID II / MiFIR; European Securities and Markets Authority—Sep. 28, 2015.

PCT International Search Report for International application No. PCT/EP2017/068801—dated Mar. 22, 2018.

International Telecommunication Union, Telecommunication Standardization Sector, Study Period 2013-2016; Study Group 15—Contribution 1626; Source: Huawei Technologies Co., Ltd, China Mobile Communications Corporation; Title: Transparency of mapping of CPRI into OTN phase 2; COM 15—C 1626—E—Feb. 2016.

PCT Written Opinion of the International Searching Authority issued for International application No. PCT/EP2017/068801—dated Mar. 22, 2018.

ITU-T, Telecommunication Standardization Sector of ITU, G.810; Series G. Transmission Systems and Media; Digital transmission systems—Digital networks—Design objectives for digital networks; Definitions of terminology for synchronization networks—Aug. 1996.

ITU-T, Telecommunication Standardization Sector of ITU, G.8260; Series G: Transmission Systems and Media, Digital Systems and Networks; Packet over Transport aspects—Synchronization, quality and availability targets; Definitions and terminology for synchronization in packet networks—Mar. 2020.

ITU-T, Telecommunication Standardization Sector of ITU, G.7041/Y.1303; Series G. Transmission systems and media, Digital systems and networks; Data over Transport—Generic aspects—General; Series Y: Global Information Infrastructure, Internet Protocol Aspects, Next-Generation Networks, Internet of Things and Smart Cities; Internet protocol aspects—Transport; Generic framing procedure—Aug. 2016.

IEEE Standard for a Precision Clock Synchronization Protocol for Networked Measurement and Control Systems IEEE Instrumentation and Measurement Society; IEEE Std 1588—Jul. 24, 2008.

IEEE Standard for local and metropolitan area networks—Timing and Synchronization for Time-Sensitive Applications in Bridged Local Area Networks; IEEE Computer Society; IEEE Std 802.1AS—Mar. 30, 2011.

* cited by examiner

METHODS, APPARATUS AND COMPUTER-READABLE MEDIA FOR SYNCHRONIZATION OVER AN OPTICAL NETWORK

PRIORITY

This nonprovisional application is a U.S. National Stage Filing under 35 U.S.C. § 371 of Inteniational Patent Application Serial No, PCT/EP2017/068801 filed Jul. 25, 2017 and entitled "Methods, Apparatus and Computer-Readable Media for Synchronization Over an Optical Network" which is hereby incorporated by reference in its entirety.

TECHNICAL FIELD

Embodiments of the disclosure relate to methods, apparatus and computer-readable media for synchronization over an optical network, and particularly to methods, apparatus and computer-readable media for transmitting and receiving synchronization and/or timing information over an optical network.

BACKGROUND

There is an increasing interest in the use of optical technology (and logical point-to-point links) to deliver accurate time synchronization.

For example, the National Laboratories of the US may need to connect remotely distributed atomic clocks, to provide scientific labs with access to an accurate reference. Access to certified and official time references (e.g., coordinated universal time (UTC)) is also a requirement for an increased number of applications. For example, the Markets in Financial Instruments Directive from the European Union requires that all trade-execution related events be captured and stored with a timestamp precision of 1 µs and a minimum accuracy of 100 µs relative to UTC.

Another example is the support of mobile device positioning in wireless networks via observed time difference of arrival (OTDOA). The fifth generation (5G) of wireless systems, as defined by the Next Generation Mobile Networks Alliance, is expected to include a requirement that mobile devices be locatable to within a few meters of accuracy. This implies that two or more radio access nodes, transmitting to a mobile device (or receiving a transmission from the mobile device) and determining the difference in time of arrival, need to be aligned in phase to within a few ns.

The use of direct optical connections is being considered as one possible approach to this problem.

SUMMARY

According to a first aspect of the disclosure, there is provided a method, in a communication network node, of providing synchronization information via an optical communication network. The method comprises: receiving, from a client, a request to initiate a synchronization service for a client node coupled to the optical communication network; and, in response to the request, establishing a synchronization service to the client node via a virtual synchronization network utilizing the optical communication network. The synchronization service utilizes a bidirectional optical channel established via the optical communication network for the transmission of synchronization data for the client.

In another aspect, a communication network node is provided, configured to perform the method recited above.

A further aspect provides a computer program product comprising code which, when executed by processing circuitry of a communication network node, causes the communication network node to perform the method recited above.

In one aspect, a communication network node is providing comprising processing circuitry and a machine-readable medium. The machine-readable medium stores instructions which, when executed by the processing circuitry, cause the communication network node to: receive, from a client, a request to initiate a synchronization service for a client node coupled to the optical communication network; and, in response to the request, establish a synchronization service to the client node via a virtual synchronization network utilizing the optical communication network. The synchronization service utilizes a bidirectional optical channel established via the optical communication network for the transmission of synchronization data for the client.

A further aspect provides a communication network node. The communication network node comprises: a receive module configured to receive, from a client, a request to initiate a synchronization service for a client node coupled to the optical communication network; and an establishing module configured to establish, in response to the request, a synchronization service to the client node via a virtual synchronization network utilizing the optical communication network. The synchronization service utilizes a bidirectional optical channel established via the optical communication network for the transmission of synchronization data for the client.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The following sets forth specific details, such as particular embodiments or examples for purposes of explanation and not limitation. It will be appreciated by one skilled in the art that other examples may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analogue) circuitry including but not limited to application specific integrated circuit(s) (ASIC) and/or field programmable gate array(s) (FPGA(s)), and (where appropriate) state machines capable of performing such functions.

Figure 1:
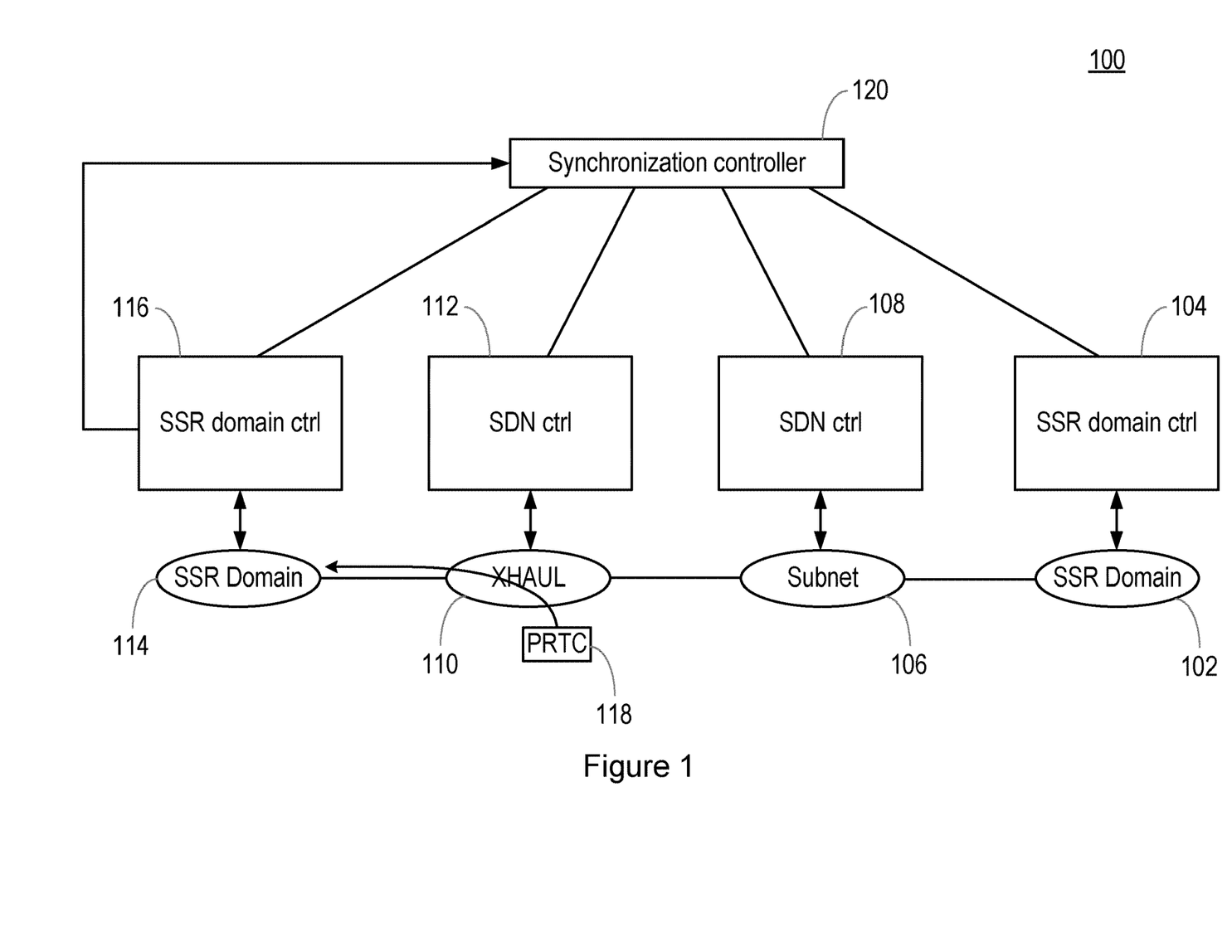
FIG. 1 shows a system according to embodiments of the disclosure.

FIG. 1 shows a system 100 according to aspects of the disclosure. The system 100 comprises a communications network, having a plurality of interconnected network domains 102, 106, 110, 114. Each network domain is coupled to a respective domain controller 104, 108, 112, 116, and each domain controller is coupled to a synchronization controller 120. Each of the domain controllers 104, 108, 112, 116 and the synchronization controller 120 may be implemented as real or virtual communication network nodes (i.e. implemented in software). The domain controllers 104, 108, 112, 116 may communicate with their respective domains and/or the synchronization controller 120 via interface protocols such as path computation element protocol (PCE-P), Netconf, etc.

Domains 102 and 114 are termed herein sync service requestor (SSR) domains, in that one or both of these domains comprises one or more clients who may request a synchronization service to be provided to a particular node of the domains 102, 114. This aspect is described in greater detail below. Domains 106 and 110 are intermediate network domains which are coupled between SSR domains 102 and 114. In the illustrated embodiment, the domains 102, 106, 110, 114 are implemented in a linear arrangement; however, in other embodiments, the domains may be connected alternatively, such as via a meshing strategy for example. Further, in alternative embodiments, more or fewer than four domains may be provided in the network.

Each of the domains may utilize one or more different communication technologies, such as electronic communications, optical communications, and wireless (radio) communications. However, at least one of the domains 102, 106, 110, 114 comprises an optical communications network via which a synchronization service may be provided.

For example, in the illustrated embodiment, the domain 110 comprises an optical communications network and is described in the drawings as "XHAUL". XHAUL is an ongoing project to develop a solution providing a connection between radio network domains and core network domains, such as may be provided for wireless telecommunications networks, e.g., such as those expected to meet the requirements for the fifth generation (5G) of wireless networks. XHAUL networks are able to provide fronthaul and/or backhaul services to such telecommunications networks. In such an embodiment, the domain 110 provides one or more of fronthaul and backhaul services (via an optical communications network) to a radio network domain, which in this case is domain 114.

Thus in one embodiment the SSR domain 114 comprises a radio network. However, in other embodiments, the SSR domain 114 may comprise a network of servers implementing financial applications, power networks, data centres, industrial automation network, etc. In general, the SSR domain 114 may operate according to any network communication modality or technology.

Each of the domain controllers 104, 108, 112, 116 may be operable to manage or configure its respective domain so as to provide or enable an overall level of service for that domain. For example, the controllers may implement one or more software defined networking (SDN) protocols, to control the transmission of data through the domain (through whichever communication technology) and attempt to optimize one or more parameters (e.g. such as throughput or efficiency, etc) or achieve a given level of service.

Each of the domain controllers 104, 108, 112, 116 is further operable to collect information on its respective domain, and provide that information to the synchronization controller 120. For example, the collected information may relate to components of the domain, and the connections between them; the domain topology; the performance of the network domain (e.g. traffic load, etc). Further examples of the information include: information on the related IEEE1588 support (and which profile, e.g. 8275.1 or 8275.2); information on synchronous Ethernet (syncE) support, information on one or more characteristics of the link (e.g., length, physical layer type, whether asymmetry compensation has been applied, etc); information on support for multi-PTP domain (e.g. in case of 1588 boundary clock, whether or not multi-BC is implemented), clock-oscillator characteristics (Holdover), etc.

A primary reference clock (PRC) or primary reference time clock (PRTC) 118 forms a further part of the system 100. The PRTC 118 may comprise an atomic clock, or a combination of multiple atomic clocks; the PRTC 118 may comprise an oscillator (such as quartz or rubidium) whose output signal is controlled to agree with signals broadcast by global navigation satellite systems (GNSS). Various alternatives will be known to the skilled person and the present disclosure is not limited in this respect.

According to embodiments of the disclosure, the synchronization controller 120 is operable to receive synchronization service requests from one or more clients operative in the SSR domains 102, 114, via the respective domain controllers 104, 116 for those domains.

Thus, in the illustrated embodiment, the SSR domain controller 116 receives a sync service request from a client operative within the domain 114, and forwards that request to the sync controller 120.

Upon receipt of the sync service request, the synchronization controller 120 is operative to establish a synchronization service for the client, enabling the transmission of synchronization information (such as one or more of time synchronization data, frequency synchronization data, delay parameters, etc) over the optical communication network to a node associated with or nominated by the client. In one embodiment, the node associated with the client is the same node from which the sync service request originated.

The sync service request may specify one or more requirements for the sync service (e.g. the required accuracy of the synchronization; the identity or identities of the node(s) which are to receive the synchronization information; whether time synchronization, frequency synchronization or both is required, etc).

The synchronization controller 120 is operable to establish the synchronization service accordingly, to provide the one or more parameters or requirements specified in the request. For example, the synchronization controller 120 may establish the synchronization service for the client by instructing the relevant domain controllers to configure their respective domains for the provision of the synchronization service. For example, where the synchronization service is to be provided to a client node in SSR domain 114 from the XHAUL domain 110, the synchronization controller 120 sends appropriate instructions to the domain controllers 112, 116 to establish the synchronization service in their respective domains. The domain controller 112 may configure the domain 110 to provide a bidirectional optical path through the optical communication network, from the PRTC 118 to an appropriate egress point at the edge of the domain. Similarly, the domain controller 116 may configure the SSR domain 114 to couple the node or nodes requiring the synchronization service to the appropriate ingress point in the domain 114 to receive the synchronization information.

The synchronization service may comprise an optical signal, transmitted over the bidirectional optical channel at a certain wavelength (lambda). For example, the synchronization service may be provided for multiple clients, all accessing the same wavelength. Alternatively, the synchronization service may comprise an optical signal transmitted over the bidirectional optical channel at different wavelengths. For example, the different wavelengths may be employed to transmit synchronization information for different clients. The optical signal may utilize a particular frame structure, such as the XHAUL frame structure. The synchronization information may be transmitted as part of the overhead of such a frame structure. The frame may be dedicated to the transmission of synchronization information, or additionally comprise data (i.e. user plane data) for transmission to the sync service requester.

Traceability of the synchronization service carried over the domain 110 may be enabled by providing a UTC traceable reference at the input of the domain 110 (e.g. via GNSS).

The synchronization service may be provided for one or multiple clients. In the latter case, each client may have its own requirements (i.e. its own parameters or requirements for the synchronization information), with respective synchronization information being provided for each client. One mechanism for achieving transmission of synchronization data for multiple clients is described below with respect to FIG. 4.

Figure 2:
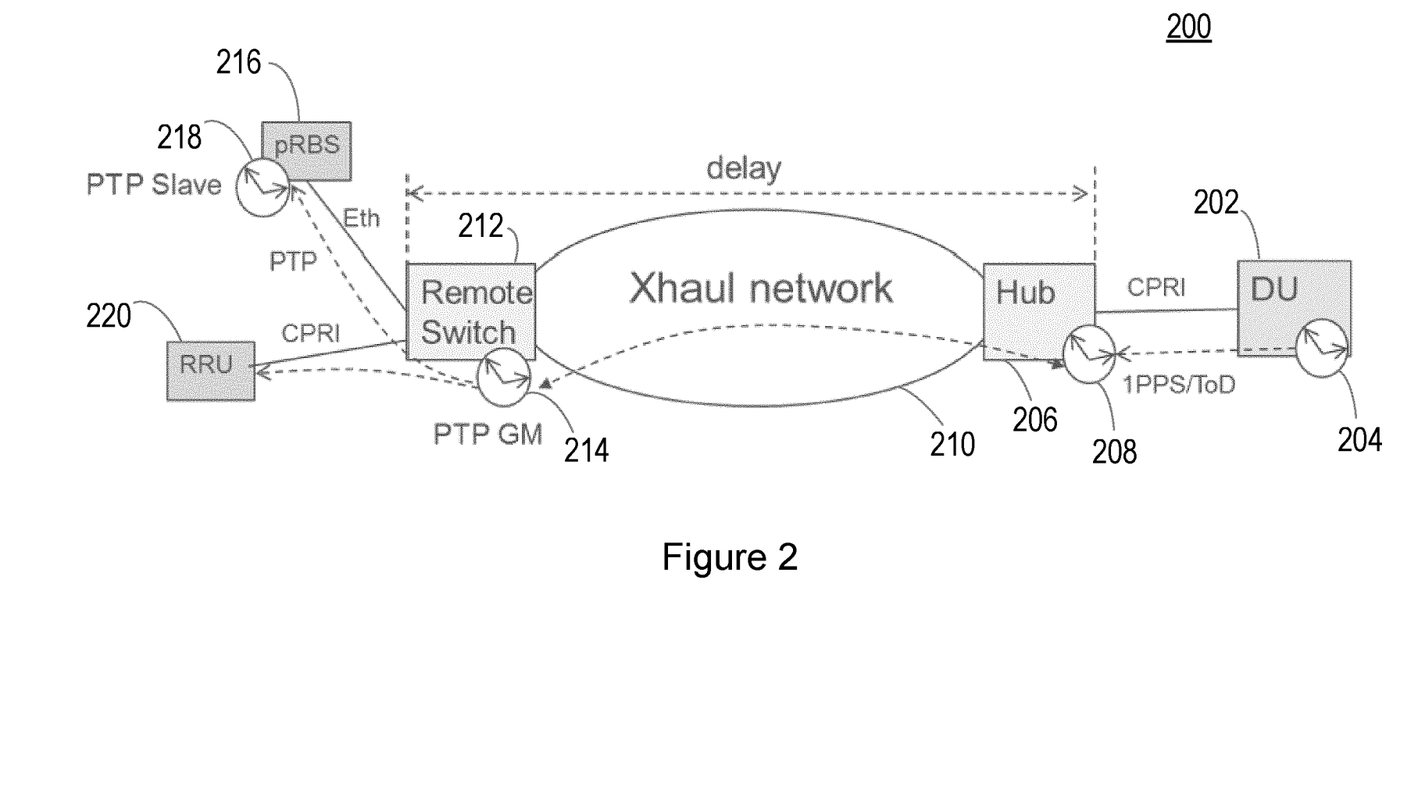
FIG. 2 shows a system according to further embodiments of the disclosure.

FIG. 2 shows one example of such a synchronization service, as provided in a telecommunications network 200. Modern radio telecommunication networks utilize distributed radio-access nodes to achieve performance gains through techniques such as multi-input-multi-output (MIMO) and co-ordinated multi-point (CoMP) transmissions. Thus a mobile device may communicate with multiple spatially diverse radio units at the same time, with each radio unit comprising the hardware necessary to transmit and receive wireless signals, such as one or more antennas, RF circuitry, up/down converters, etc. The signals for each radio unit may be processed centrally by a common processing unit. In such a scenario, the radio units may be termed remote radio units (RRUs), while the processing unit may be termed a digital unit (DU). It will be understood by those skilled in the art that the separation of transmission and reception hardware from the processing hardware may also be implemented in scenarios without co-ordinated transmission between the radio units. For example, a DU may provide processing capability for one or more RRUs regardless of whether those RRUs are transmitting in a co-ordinated fashion to a single mobile device or not.

Thus, in the example of FIG. 2, a DU 202 provides processing capabilities for one or more remote radio units 216, 220. In the example of FIG. 2, the DU 202 provides processing capabilities for a pico radio base station (pRBS) 216 and a remote radio unit 220; however, in alternative embodiments the DU 202 may provide processing capabilities for one or more radio units, which may have the same or different designations.

In more detail, the DU 202 comprises or has access to a PRTC or other certified clock 204. The DU 202 is coupled to a hub 206, via any suitable interface (such as common public radio interface (CPRI)). The hub 206 also comprises a synchronization device or clock 208. The hub provides an ingress point to an optical communications network 210 which, in this example, provides a fronthaul network between the DU 202 and the radio units 216, 220.

At the egress point of the network 210, a remote switch 212 (e.g. an electro-optic switch, operative to receive an optical signal, and provide an electrical signal) provides coupling to one or both of the radio units 216, 220. The remote switch 212 further comprises or has access to a synchronization device or clock 214.

In operation, the reference clock 204 of the digital unit 202 provides a timing signal to the hub 206, and particularly the clock 208 of the clock 206, with which the clock 208 can be calibrated and made accurate. For example, the timing signal may comprise an indication of the current time of day (ToD) as defined by the clock 204. For example, the timing signal may comprise a 1 pulse per second (1 PPS) signal.

A bidirectional optical channel is established between hub 206 and the remote switch 212 via the optical network 210 (i.e. an optical channel over which signals can be transmitted in the direction from the hub to the remote switch, and in the direction from the remote switch to the hub). For example, switching components within the network 210 may be configured appropriately to provide an optical route for the signals between the hub 206 and the switch 212. In one embodiment, the bidirectional optical channel is a "direct" optical channel, in that only optical components are provided between the hub 206 and the switch 212 (i.e. no electrical or electro-optic switching components are provided within the path over the network 210).

Synchronization information, based on the output of the clock 208 (which in turn may be based on the timing signal from the PRTC 204), is transmitted over the bidirectional optical channel, from the hub 206 to the switch 212. In one embodiment, the synchronization information comprises timing information, i.e. an indication of the current time. In another embodiment, the synchronization information comprises frequency information. Further information with regard to this aspect is provided below with respect to FIG. 3. In a further embodiment, both timing and frequency information are transmitted as part of the synchronization information.

The remote switch 212 receives the synchronization information and recovers the accurate time for its clock 214 based on the synchronization information.

The remote switch 212 forwards the timing information to the radio units 216, 220. The timing information can be forwarded in various ways. For example, in one embodiment the clock 214 may be implemented as a precision time protocol (PTP) grandmaster clock, and the timing may be sent via the PTP protocol to a PTP slave clock operative in the radio unit (i.e. as shown in FIG. 2 for the pRBS 216 and its respective clock 218). Alternatively, the timing information may be forwarded for direct use by the radio unit, using CPRI (i.e. as shown in FIG. 2 for the RRU 220).

It will be noted from the discussion above that the synchronization service may be provided for multiple clients. Thus, in the embodiment of FIG. 2, it is possible that the pRBS 216 and the RRU 220 have different synchronization requirements and therefore require different synchronization information. Therefore different data may be forwarded from the remote switch 212 for each of the radio units.

Of course, each of the clocks utilized in the network 210 (i.e. clock 214) may already be reasonably accurate. For example, it can be expected that the accuracy of a conventional clock with respect to its own reference (e.g. UTC) is $10^{-8}$, or accurate to within 10 ns. In order to improve this accuracy significantly, measurements may have to carried out on the synchronization information over an extended period of time (e.g. on the order of hours). Thus the synchronization service may comprise the repeated transmission of synchronization information over the bidirectional optical channel. For example, the synchronization information may be transmitted repeatedly at regular intervals (such as once every second). Measurements can then be performed on the data of each synchronization transmission over an extended period of time.

Thus synchronization information is transmitted over an optical communications network via a bidirectional optical channel. The optical channel is bidirectional to enable the path delay between the hub 206 and the switch 212 to be measured. For example, the delay may be measured based on timestamps applied to messages transmitted between the hub 206 and the switch 212. That is, timing messages may be transmitted from the hub 206 to the switch 212, and then from the switch 212 to the hub 206 (or vice versa) to enable the round trip delay to be determined. Half this value then provides an estimate of the one-way delay. The delay may be provided from the hub 206 to the remote switch 212 (e.g. as part of the synchronization information), or determined directly in the remote switch 212 itself. The delay can be used, in conjunction with the time information provided in the synchronization information, to determine the absolute time in the remote switch 212.

FIG. 2 shows an implementation in which synchronization information is transmitted over an optical communications network. As noted above, the synchronization information may comprise timing information and/or frequency information. For example, the timing information may be the absolute time (e.g. ToD), or a pulsed signal such as 1 PPS.

Figure 3:
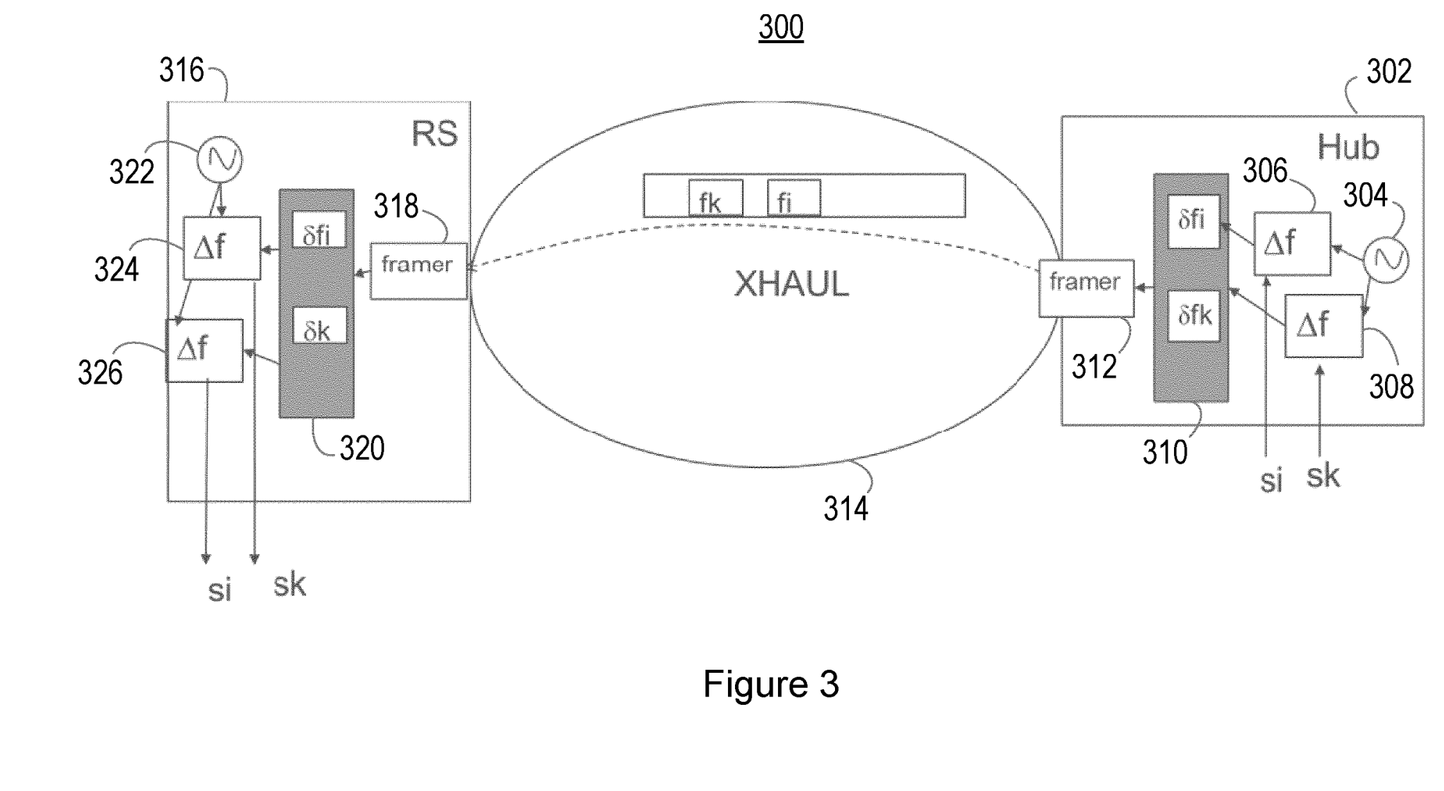
FIG. 3 shows a system according to further embodiments of the disclosure.

FIG. 3 shows an implementation in a network 300 for the transmission of frequency information. The network 300 comprises a hub 302, which defines an ingress point for an optical communications network 314, and a remote switch 316, which defines an egress point for the network 314. The network 300, hub 302, optical network 314 and remote switch 316 may correspond to the network 200, hub 206, optical network 210 and remote switch 212 respectively described above with respect to FIG. 2.

FIG. 3 shows an implementation in which frequency synchronization information is provided for two clients, labelled i and k, each client having different requirements for the frequency of the synchronization signal. As noted above, however, the synchronization service may be provided for any number of clients (e.g. one or more than two).

The hub 304 comprises an oscillator 304, which represents the network clock signal (e.g. which is used to provide synchronized frame timings, etc for transmissions over the network 314). The output of the oscillator 304 is therefore a clock signal at the network clock frequency. The synchronization signals for the clients, $s_i$ and $s_k$, are provided to respective differential modules 306 and 308, which determine the difference in frequency between the respective synchronization signals and the frequency of the local oscillator 304. In the illustrated embodiment, a first differential module 306 receives the signal $s_i$ and determines the difference in frequency between that signal and the local oscillator output. A second differential module 308 receives the signal $s_k$ and determines the difference in frequency between that signal and the local oscillator output. Each module outputs respective signals 310 $\delta fi$ and $\delta fk$, indicating the respective differences in frequency. Those skilled in the art will appreciate that alternatively a single differential module may be provided, and operable to determine the differences in frequency of multiple signals (e.g. in a time-division multiplexed fashion).

The differential frequency information 310 is framed (i.e. inserted into appropriate frames or otherwise prepared for transmission) by a framer 312, and transmitted over a bidirectional optical channel over the network 314 to the remote switch 316.

The remote switch 316 comprises a respective framer 318, which receives the synchronization information and recovers the differential frequency information 320 (i.e. $\delta fi$ and $\delta fk$). The remote switch 316 also comprises or has access to an oscillator 322, which is configured to the same frequency as oscillator 304 and thus corresponds to the network frequency (i.e. the frequency at which frames are generated, etc). the output of the oscillator 322 and the differential frequency information 320 (i.e. $\delta fi$ and $\delta fk$) are provided to respective differential modules 324, 326, which output signals $s_i$ and $s_k$ at the required frequencies.

Alternatively, the frequency values may be encoded based on a ratio of the frequencies instead of a differential. For example, the frequency values may be encoded according to the RateRatio parameter specified in IEEE 802.1AS, e.g. a measured ratio of the frequency of the grandmaster clock to the frequency of the timestamping clock.

Thus frequency synchronization information may be provided in addition to the absolute timing information.

Figure 4:
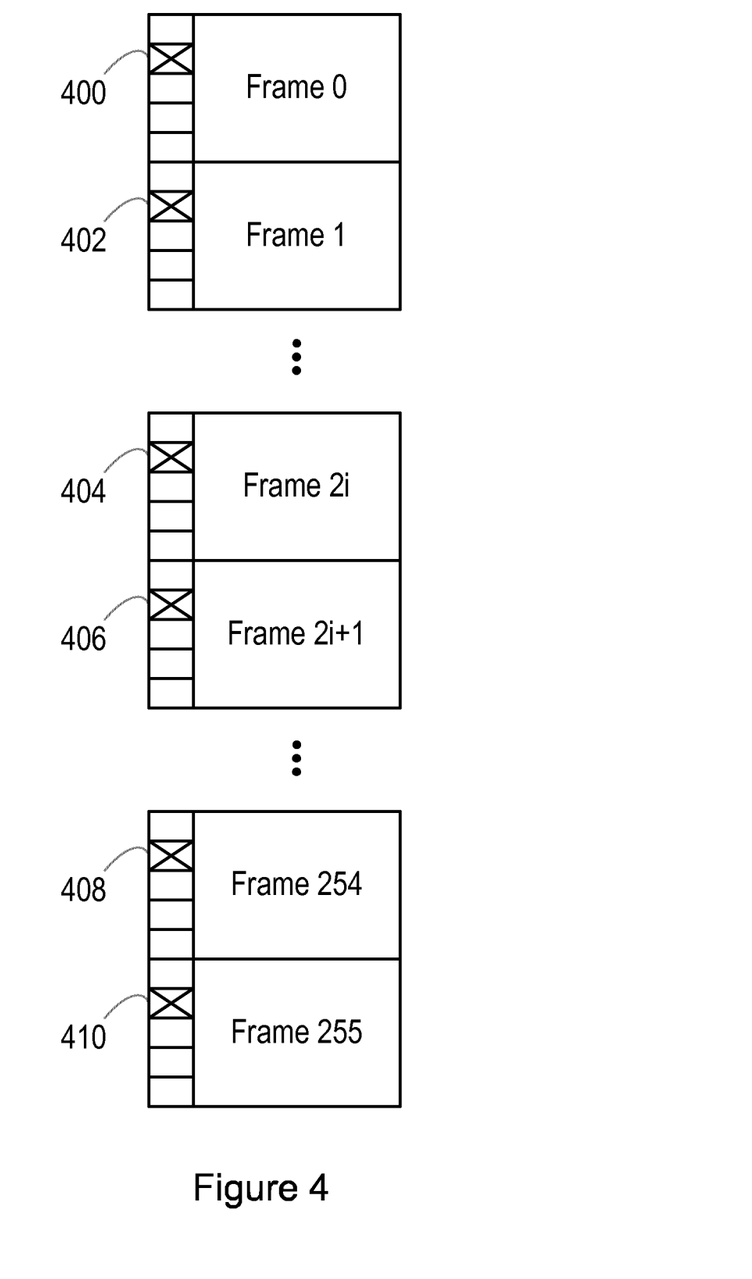
FIG. 4 is a schematic diagram of a multiframe structure for an optical signal according to embodiments of the disclosure.

FIG. 4 is a schematic diagram showing an optical signal of the synchronization service according to an embodiment of the disclosure, in which multiple clients are served by the service.

The optical signal comprises a multiframe structure. Each frame of the multiframe structure may be configured according to a given protocol, such as may be used on an XHAUL network, for example. Each frame may comprise multiple timeslots. In the illustrated example, the multiframe structure comprises 256 frames (i.e. to enable the use of simple 8-bit counters to track the frame number), but those skilled in the art will appreciate that different numbers of frames may be utilized.

According to the illustrated embodiment, the synchronization information transmitted in each frame is allocated to a particular client of the synchronization service. For example, the synchronization information transmitted in Frame 0 (i.e. the first, or initial, frame of the multiframe structure) and the following frame, Frame 1, may be provided for a first client (i.e. client 0). For example, the timing synchronization information (e.g., the absolute time) may be provided in Frame 0, while the frequency deviation information (e.g. as computed above with respect to FIG. 3) may be provided in Frame 1. In providing the time and frequency information for a single client in consecutive frames, processing of the optical signal for multiple clients can be simplified.

Such an implementation would imply that synchronization information for the ith client is provided in the 2ith and (2i+1)th frames of the multiframe structure, and that up to 128 clients can be served within a single multiframe structure of 256 frames. Alternatively, one or more frames of the structure may be dedicated or reserved for the transmission of information (such as synchronization data) for the optical network itself (e.g. the XHAUL network).

The synchronization information may be provided within the same slot in each frame, i.e. the same slot number in each frame. For example, time synchronization information for client 0 may be provided in slot 400 (in Frame 0); frequency synchronization information for client 0 may be provided in slot 402 (which has the same slot number as slot 400). Similarly, time synchronization information for client i may be provided in slot 404 (in Frame 2i), while frequency synchronization information for client i is provided in slot 406. At the end of the multiframe structure, time synchronization information for client 127 may be provided in slot 408 (in Frame 254), while frequency synchronization information for client 127 may be provided in slot 410 (in the final frame, Frame 255).

The time sync data may be mapped according to PTP message encapsulated, for example, into generic framing procedure frames (GFP-F) as specified in ITU-T G.7041, The frequency deviation data may comprise 64 bits (i.e. 8 bytes), and may be mapped as a sequence of 8 bytes following an FF byte (i.e. a byte consisting of 8 ones). The following bytes, after the sequence of 8 bytes, may be encoded as zeros.

The frames of the multiframe structure may be dedicated to the transmission of synchronization information (i.e. provided solely for synchronization purposes), or may carry traffic data (i.e. user plane data) in addition to the synchronization data.

Thus FIG. 4 sets out one example by which multiple clients may be provided with respective synchronization data. Those skilled in the art will appreciate that alternative mechanisms may be used without departing from the scope of the disclosure. For example, synchronization data may be provided in a packet of data, addressed to the particular client which requested the synchronization service.

Figure 5:
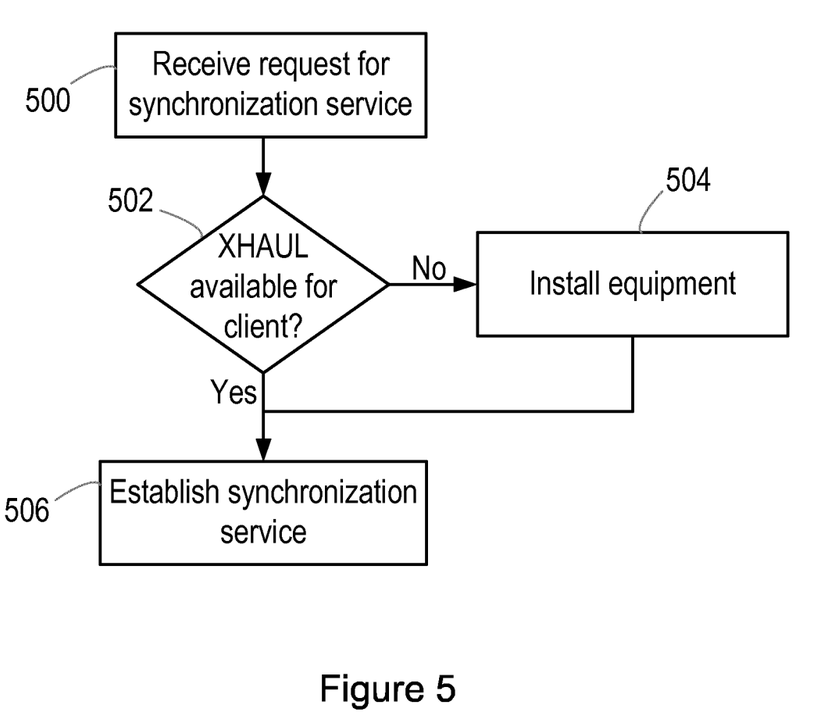
FIG. 5 is a flowchart of a method according to embodiments of the disclosure.

FIG. 5 is a flowchart of a method according to embodiments of the disclosure. The method may be carried out in a communication network node, such as the synchronization controller 120 described above with respect to FIG. 1.

The method begins in step 500, in which a request to establish a synchronization service for a particular client is received. The request may be received from a domain controller for the domain in which the client is based (e.g. the domain controller 116).

The request may define one or more performance characteristics or requirements for the synchronization service (e.g., accuracy, reliability, traceability). The request may specify whether the synchronization is to be transparent (i.e. based on a source of time owned or operated by the client), or whether a source of time is offered by the network operator. The request may specify a demarcation point for the synchronization service, i.e. the interface between the client and the service provider that identifies the responsibility area of the service provider. For example, the demarcation point may be defined as the egress of the optical network, where the synchronization service terminates (e.g. at the remote switch 212). The clock 214 at the egress point may then be utilized to provide a pulsed signal or other absolute time signal to the client (such as the signal provided from the remote switch 212 to the RRU 220 shown above in FIG. 2). Alternatively, the demarcation point may be defined as the node itself which is to receive the synchronization signal, in which case the synchronization data itself may be provided to the node to establish its own timing (e.g., such as the signal provided from the remote switch 212 to the pRBS 216 shown above in FIG. 2). These two possibilities may also be associated with the possibilities of providing only synchronization (i.e. a timing signal) to the client, or providing data to the client in addition to the synchronization information.

In step 502, the communication network node determines if a suitable optical network structure (e.g. an XHAUL structure) is available with a point of presence (e.g., a remote switch) at the client site. If such a suitable network structure is in place (e.g. the optical network is already established and providing user traffic to the client), the method proceeds to step 506, in which the communication node establishes a synchronization service for the client.

If a suitable network structure is not in place, the method proceeds to step 504, in which the physical network equipment may be installed at the client site. The equipment which is necessary may depend on the requirements of the synchronization service and the equipment which is already in place. For example, if physical connectivity is already available at the client site, but providing traffic to other clients, additional cabling may be required to establish additional physical connectivity for the client requesting the synchronization service. If no physical connectivity is available (i.e. no point of presence is available), installation of such hardware is required if the synchronization service is to be established.

In step 506, the synchronization service is established for the requesting client, enabling the transmission of synchronization information (such as one or more of time synchronization data, frequency synchronization data, delay parameters, etc) over an optical communication network to a node associated with or nominated by the client. In one embodiment, the node associated with the client is the same node from which the sync service request originated.

The communication network node is operable to establish the synchronization service according to the requirements set out in the request received in step 500, to provide the one or more parameters or requirements specified in the request. For example, the communication network node may establish the synchronization service for the client by instructing the relevant domain controllers to configure their respective domains for the provision of the synchronization service.

The synchronization service may comprise an optical signal, transmitted over the bidirectional optical channel at a certain wavelength (lambda). The optical signal may utilize a particular frame structure, such as the XHAUL frame structure. The synchronization information may be transmitted as part of the overhead of such a frame structure. The frame may be dedicated to the transmission of synchronization information, or additionally comprise data (i.e. user plane data) for transmission to the sync service requester.

The synchronization service may be provided for multiple clients, and thus the service requested in step 500 may be in addition to synchronization already provided for other clients via the optical network. One method of providing such a service is described above with respect to FIG. 4, and comprises the use of a multiframe format, with respective synchronization information for each client transmitted on respective frames of the multiframe format. Thus, in such an embodiment, establishing a synchronization service may comprise selecting a slot or frame for the client in the multiframe format.

Once established, the synchronization service is activated and synchronization information transmitted to the client, as described above.

Figure 6:
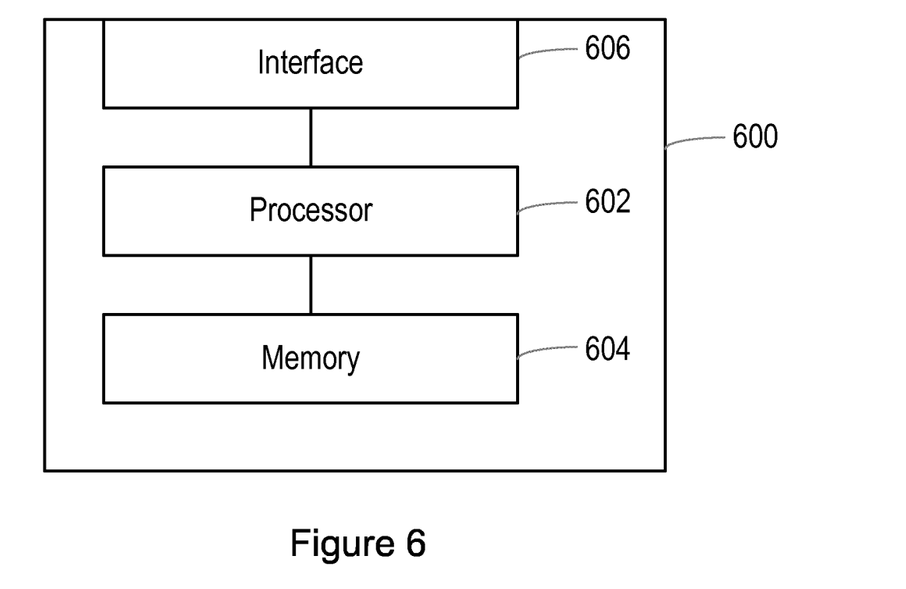
FIG. 6 is a schematic diagram of a communication network node according to embodiments of the disclosure.

FIG. 6 is a schematic diagram of a communication network node 600 according to embodiments of the disclosure. For example, the communication network node 600 may correspond to the synchronization controller 120 described above with respect to FIG. 1. Alternatively, the communication network node 600 may correspond to either of the hubs 206, 302 described above with respect to FIGS. 2 and 3.

The communication network node 600 comprises processing circuitry 602 and a non-transitory machine-readable medium (such as memory) 604. The machine-readable medium stores instructions which, when executed by the processing circuitry 602, cause the communication network node 600 to: receive a request to initiate a synchronization service for a client node coupled to the optical communication network; and, in response to the request, establish a synchronization service to the client node via a virtual synchronization network utilizing the optical communication network. The synchronization service utilizes a bidirectional optical channel established via the optical communication network for the transmission of synchronization data for the client.

The communication network node 600 may further comprise one or more interfaces 606, providing interfaces for the transmission and/or reception of signals via any suitable modality. For example, the interfaces 606 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The processing circuitry 602, machine-readable medium and interfaces may be coupled to each other in any suitable manner. For example, although FIG. 6 shows the components coupled together in series, it will be understood by those skilled in the art that the components may be coupled together in an alternative manner, such as via a bus.

Figure 7:
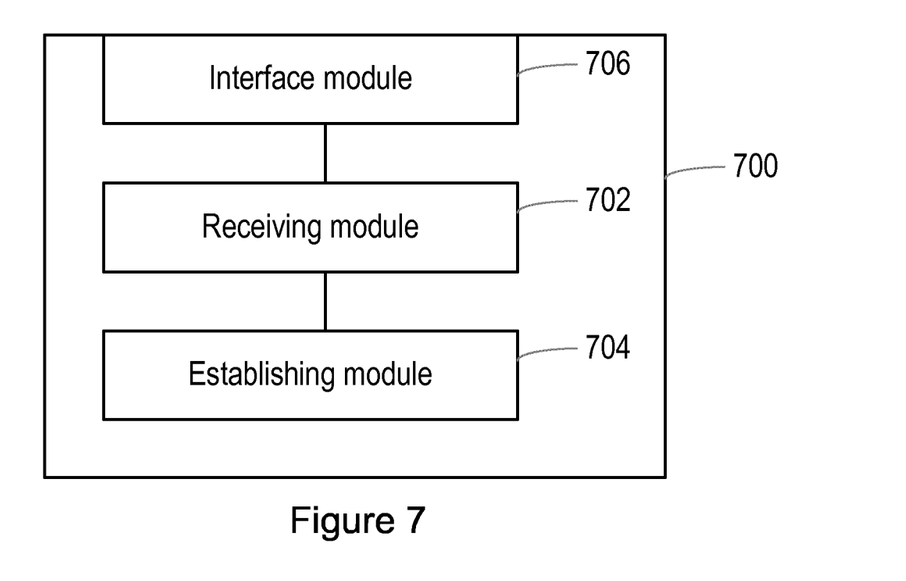
FIG. 7 is a schematic diagram of a communication network node according to further embodiments of the disclosure.

FIG. 7 is a schematic diagram of a communication network node 700 according to further embodiments of the disclosure. For example, the communication network node 700 may correspond to the synchronization controller 120 described above with respect to FIG. 1. Alternatively, the communication network node 700 may correspond to either of the hubs 206, 302 described above with respect to FIGS. 2 and 3.

The communication network node 700 comprises a receiving module 702 and an establishing module 704. The receiving module 702 is configured to receive a request to initiate a synchronization service for a client node coupled to the optical communication network. The establishing module 704 is configured to establish, in response to the request, a synchronization service to the client node via a virtual synchronization network utilizing the optical communication network. The synchronization service utilizes a bidirectional optical channel established via the optical communication network for the transmission of synchronization data for the client.

The communication network node 700 may further comprise an interface module 706, providing one or more interfaces for the transmission and/or reception of signals via any suitable modality. For example, the interface module 706 may comprise circuitry suitable for the transmission and/or reception of electrical, wireless or optical signals, and thus may comprise circuitry such as optical transmitters and receivers, wireless or radio transceiver circuitry and/or antennas, and digital processing circuitry for the transmission of electrical signals.

The receiving module 702, establishing module 704 and interface module 706 may be coupled to each other in any suitable manner. For example, although FIG. 7 shows the components coupled together in series, it will be understood by those skilled in the art that the components may be coupled together in an alternative manner, such as via a bus.

The present disclosure therefore provides methods, apparatus and computer-readable mediums for providing a synchronization service over an optical communications network.

The description above has focussed on XHAUL as this is currently being defined for existing use cases such as fronthaul and the current XHAUL implementation is targeting limited distances, (up to 80 Km), This allows to cover a significant number of examples (e.g. urban sync distribution). However, those skilled in the art will appreciate that the concepts described herein are equally applicable to alternative optical networks, such as dense wavelength division multiplexing (DWDM) networks, which allows a wider range of applications to be addressed (e.g., connecting remote towns).

The invention claimed is:

1. A method, in a communication network node, of providing synchronization information via an optical communication network, the method comprising:
   receiving, from a client, a request to initiate a synchronization service for a client node coupled to the optical communication network; and
   in response to the request, establishing a synchronization service to the client node via a virtual synchronization network utilizing the optical communication network, wherein the synchronization service utilizes a bidirectional optical channel established via the optical communication network for the transmission of synchronization data for the client.

2. The method according to claim 1, wherein the virtual synchronization network is configurable to provide respective synchronization services for a plurality of clients.

3. The method according to claim 1, wherein the synchronization data is transmitted via the bidirectional optical channel in one or more packets of data.

4. The method according to claim 1, wherein the synchronization data is transmitted via the bidirectional optical channel in a repeated frame structure comprising a plurality of frames, wherein synchronization data for the client is provided in a first frame of the plurality of frames.

5. The method according to claim 1, wherein the synchronization data comprises one or more of:
   time information from a primary reference clock; and
   frequency deviation information.

6. The method according to claim 5, wherein the frequency deviation information is encoded as a differential signal.

7. The method according to claim 1, wherein the request comprises an indication of one or more parameters, and wherein the synchronization data comprises values for the one or more parameters.

8. The method according to claim 1, wherein the synchronization service comprises repeated transmission of synchronization data for the client.

9. The method according to claim 8, wherein the synchronization data for the client is transmitted at regular intervals.

10. The method according to claim 1, wherein the bidirectional optical channel is further utilized for the transmission of data for the client.

11. The method according to claim 1, wherein the bidirectional optical channel is dedicated to the provision of synchronization information for the client.

12. A communication network node, comprising processing circuitry and a machine-readable medium storing instructions which, when executed by the processing circuitry, cause the communication network node to:
  receive a request, from a client, to initiate a synchronization service for a client node coupled to an optical communication network; and
  in response to the request, establish a synchronization service to the client node via a virtual synchronization network utilizing the optical communication network,
  wherein the synchronization service utilizes a bidirectional optical channel established via the optical communication network for the transmission of synchronization data for the client.

13. The communication network node according to claim 12, wherein the virtual synchronization network is configurable to provide respective synchronization services for a plurality of clients.

14. The communication network node according to claim 12, wherein the synchronization data is transmitted via the bidirectional optical channel in one or more packets of data.

15. The communication network node according to claim 12, wherein the synchronization data is transmitted via the bidirectional optical channel in a repeated frame structure comprising a plurality of frames, wherein synchronization data for the client is provided in a first frame of the plurality of frames.

16. The communication network node according to claim 15, wherein each frame of the plurality of frames comprises a plurality of time slots, and wherein the synchronization data for the client is provided in one or more particular time slots of the plurality of time slots of the first frame.

17. The communication network node according to claim 12, wherein the synchronization data comprises one or more of:
  time information from a primary reference clock; and
  frequency deviation information.

18. The communication network node according to claim 17, wherein the frequency deviation information is encoded as a differential signal.

19. The communication network node according to claim 12, wherein the request comprises an indication of one or more parameters, and wherein the synchronization data comprises values for the one or more parameters.

20. The communication network node according to claim 12, wherein the bidirectional optical channel is further utilized for the transmission of data for the client.

21. A communication network comprising a communication network node and at least one client, the communication network node comprises a processing circuitry and a machine-readable medium for storing instructions which, when executed by the processing circuitry, cause the communication network node to:
  receive a request, from the client, to initiate a synchronization service for a client node coupled to an optical communication network; and
  in response to the request, establish a synchronization service to the client node via a virtual synchronization network utilizing the optical communication network, p1 wherein the synchronization service utilizes a bidirectional optical channel established via the optical communication network for the transmission of synchronization data for the client.

* * * * *

UNITED STATES PATENT AND TRADEMARK OFFICE
CERTIFICATE OF CORRECTION

| | |
|---|---|
| PATENT NO. | : 11,153,065 B2 |
| APPLICATION NO. | : 16/632617 |
| DATED | : October 19, 2021 |
| INVENTOR(S) | : Ruffini et al. |

It is certified that error appears in the above-identified patent and that said Letters Patent is hereby corrected as shown below:

In the Claims

In Column 14, Line 32, in Claim 21, delete "p1 wherein" and insert -- wherein --, therefor.

Signed and Sealed this
Tenth Day of May, 2022

Katherine Kelly Vidal
*Director of the United States Patent and Trademark Office*